UNITED STATES PATENT OFFICE.

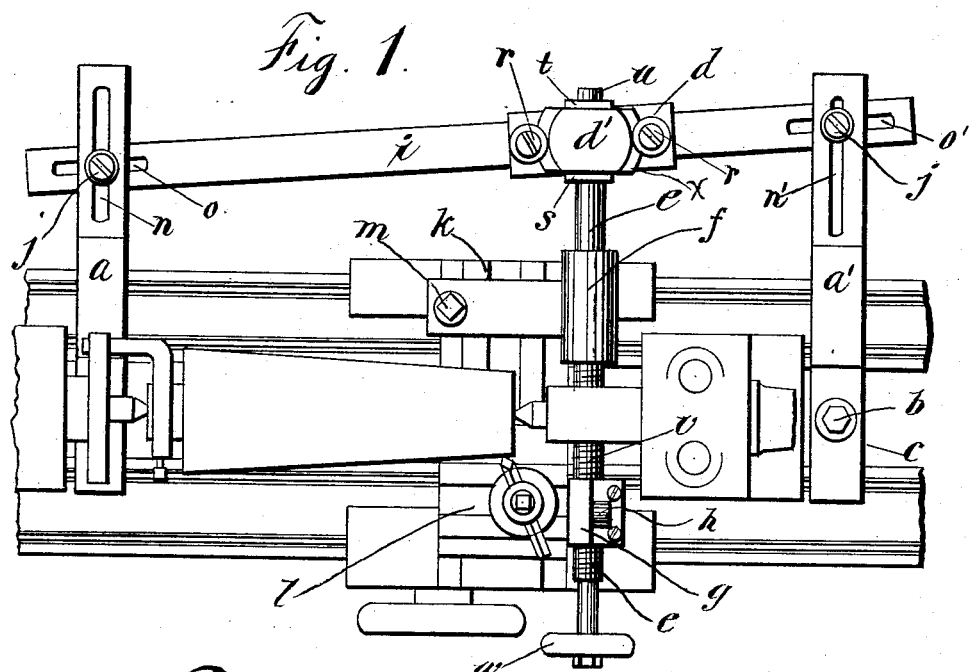

HENRY C. BROWN, OF BROOKLYN, NEW YORK.

REMOVABLE TAPER ATTACHMENT FOR LATHES.

1,171,767.  Specification of Letters Patent.  Patented Feb. 15, 1916.

Application filed September 17, 1913. Serial No. 790,260.

*To all whom it may concern:*

Be it known that I, HENRY C. BROWN, a citizen of the United States, and resident of Brooklyn, in the county of Kings and State of New York, have invented certain new and useful Removable Taper Attachments for Lathes, of which the following is a specification.

A taper attachment is used for guiding the cutting tool away from or toward the center of revolution of a lathe in combination with the longitudinal feed, thereby tapering the work to the same angle at which the attachment is set. Taper cutting may also be accomplished by setting the tail center of the lathe horizontally out of line, or by the use of the compound rest, both of which are limited in action.

Taper attachments now in use are permanent fixtures to a lathe, requiring inconvenient parts, and have much lost motion, which must be allowed for in using, all of which I have endeavored to overcome in my invention, the object of which is to provide an easily and quickly attached and removed mechanism, the application of which shall in no way injure a lathe, and yet be practically positive in operation. I attain this in the manner described as follows, referring to the accompanying drawings, in which like figures represent like parts.

Figure 1 represents the attachment in place on a lathe as it would appear from above. Fig. 2 represents one of the supporting arms attached to the inner tracks of a lathe and arched over the outer track to allow the carriage to pass. Fig. 3 represents the guide-bar. Fig. 4 represents the guide with the swiveling portion in which the bearing for the adjustable feed screw is located. Fig. 5 represents the adjustable feed-screw, with the take up collars, blank shaft portion, threaded portion and handwheel. Fig. 6 represents the sleeve bearing, and the most convenient and usual manner of fastening it to the lathe carriage. Fig. 7 represents the split nut and the screws for attaching and adjusting it.

Referring to Fig. 1, "$a$" is a supporting arm fastened close in front of the headstock of a lathe, to the two inner tracks, by a bolt "$b$" and a strap "$c$," and "$a'$" is a supporting arm similarly fastened behind the tailstock, and shown in detail in Fig. 2. To allow full travel of the sliderest, the arms are arched over the outside track of the lathe. The outwardly extended portions of the supporting arms "$a$" and "$a'$" are provided with slots "$n$" and "$n'$," for the reception of the bolts "$j$" and "$j'$," which extend through the ends of the guide bar "$i$" and bind it rigidly in place on the under side of the supporting arms, after it has been set to the desired angle. The guide "$d$" rides on the guide-bar "$i$," and is provided with downwardly extended sides, "$p$," shown in Figs. 4 and 5, which act as a gib to keep it in place, and resist the pull of the cutting tool. The upper portion "$d'$" of the guide "$d$" is provided with a transverse bearing "$q$" for the reception of the end of the adjustable feedscrew "$e$," and is also let into the top of the guide "$d$" by annular steps "$x$" which allow it to swivel on the guide "$d$" without alteration to its central position, and is fastened in place loosely by the screws "$r$." The adjusting screw "$e$" is provided with a journal fitting into the bearing "$q$" in the guide "$d$" in which it revolves freely, and is also furnished with a shoulder "$s$" washer "$t$" and nut "$u$" to take up endwise lost motion.

The shaft "$e'$" of the screw "$e$" passes through a sleeve or bearing "$f$," which is rigidly secured to the slides of the lathe saddle "$k$," by the screw "$m$," and through which it is free to revolve and to slide endwise. The threaded portion "$v$" of the screw "$e$" is screwed through the nut "$g$" and terminates in a handwheel "$w$." The nut "$g$" is fastened to the side of the tool rest by the screw "$h$" which enters a threaded hole tapped in the tool rest for that purpose.

To use this taper attachment the arms "$a$" and "$a'$" are placed in position on the lathe and fastened securely there by the bolts "$b$" and straps "$c$," after which, the guide "$d$," screw "$e$," sleeve "$f$" and nut "$g$," which may remain assembled, are placed in position, and the sleeve "$f$" is fastened to the end of the slides of the saddle "$k$," by the screw "$m$," which draws a gib tight, and by fastening the nut "$g$," to the side of the tool rest "$l$," by the screw "$h$." The crossfeed screw of the lathe is then disconnected or removed altogether, after which the guide-bar "$i$" is placed under the guide "$d$" and fastened lightly to the arms "$a$" and "$a'$," and set at the required angle, either by marks on the sides of the arms, or measuring from it to the planed edge of the lathe bed, and the bolts "j" and "j'" then tightened. The tool then being set for the cut, and the lathe started, the longitudinal feed draws the carriage forward, the sleeve "f," through the agency of the screw shaft "e," forces the guide "d" to keep pace with it along the guide bar "i," and as the guide bar "i" is at an angle to the longitudinal center of the lathe, the guide "d" will draw the screw "e" through the sleeve "f" and also draw the tool rest "l," which carries the cutting tool, in the direction in which the guide bar "i" is set, compelling the tool to travel forward parallel to the guide bar, and as all lost motion between the guide "i," and the tool rest "l," is eliminated by the adjustments shown, the carriage may be run back and the tool set up for the following cut, as though for ordinary turning. When the work is finished, the attachment may be quickly detached, the cross feed screw of the lathe replaced, and the lathe will be ready for ordinary work. The manner of driving the guide from the carriage, as described, must necessarily be varied, because of the different forms of lathe carriages, some of which would not admit of the use of the driver described, but such variations will be of the same scope and action.

Having described my invention and the manner of using it, what I claim as new and desire Letters Patent for, is, 1. In a taper attachment for lathes, two arms or brackets constructed to be removably attached to the shears of a lathe and arranged to extend outwardly and back, a guide bar or track angularly and longitudinally adjustable on said arms, a saddle slidably mounted upon said guide bar or track; said saddle having an upper portion swiveled thereto, a bearing supported in said upper portion, a shaft rotatably mounted in said bearing and provided with collars on opposite sides of the bearing to prevent endwise movement of the shaft, and further provided with an intermediate smooth bearing portion, and a threaded portion, a sleeve bearing for said intermediate portion constructed and arranged for detachable connection to the lathe carriage; a nut provided with means to prevent end play and receiving the threaded portion of said shaft, said nut constructed for detachable connection to the tool slide and said shaft having a hand wheel at its forward end at the front of the lathe, all for the purpose set forth.

2. In a taper attachment for lathes the combination of two removable arms or brackets extending outwardly and rearwardly from the shears of a lathe, bolts and straps for detachably connecting the arms or brackets to the shears, a guide bar or track longitudinally and angularly adjustably mounted on said arms, a guide or saddle superimposed upon and straddling said guide bar or track and freely slidable thereon, said guide or saddle being provided with a swiveling upper portion and having a bearing, a shaft having one end rotatably mounted in said bearing and being provided with collars or shoulders on opposite sides of the bearing to prevent end play of the shaft, said shaft also provided with a smooth bearing portion, a threaded portion and an operating means; a sleeve arranged to rotatably and slidably support the smooth bearing portion of the shaft and constructed for detachable connection to the lathe carriage, a nut arranged for detachable connection to the lathe carriage for receiving the threaded portion of said shaft said nut also provided with means for preventing loose end play of the screw and being arranged at the front of the carriage, all constructed and arranged for the purpose specified.

3. The combination of removable arms or brackets constructed for detachable connection to the tracks of a lathe, a guide bar or track, angularly adjustable on said arms or brackets, a saddle or guide provided with a swiveling bearing slidably mounted on said saddle or guide, a shaft having one end rotatably mounted in said swiveling bearing and provided with adjusting collars on opposite sides of the bearing, said shaft further provided with a threaded portion and a smooth bearing portion intermediate the threaded portion and the swiveling bearing and also with an operating means at the forward end of the shaft, a sleeve for rotatably supporting the smooth portion and constructed for detachable connection to a lathe carriage, an adjustable nut for receiving the threaded portion of the shaft constructed for detachable connection to the lathe carriage whereby the tool may be adjusted for the required cut, all constructed and arranged for the purpose specified.

4. In a lathe for forming tapers, the combination of a bed, a carriage longitudinally slidable on said bed, a tool slide transversely slidable on the carriage, a pair of rearwardly extending arms or brackets adjustably mounted on said bed, a guide bar or track, angularly and longitudinally adjustable on said arms, a saddle having a swiveled upper portion slidably mounted on said guide bar, a bearing formed in the swiveled upper portion, a rotatable shaft having its rear end journaled in said bearing, collars on said shaft on opposite sides of the bearing for preventing endwise movement of the shaft, said shaft further having an intermediate smooth bearing portion and a threaded portion, a sleeve bearing to receive said intermediate bearing portion mounted on the carriage; a nut mounted on the tool slide for receiving the threaded portion of the shaft, said nut provided with means for preventing end play of the screw shaft through it, and said shaft having an operating hand wheel on its forward end, all for the purpose specified.

Signed at Brooklyn, in the county of Kings and State of New York, this 15th day of September, A. D. 1913.

HENRY C. BROWN.

Witnesses:
FRANK E. HOLLOWAY,
H. T. OLTMAN.

Copies of this patent may be obtained for five cents each, by addressing the "Commissioner of Patents, Washington, D. C."